United States Patent [19]
Cardillo et al.

[11] Patent Number: 5,928,362
[45] Date of Patent: Jul. 27, 1999

[54] PERIPHERAL CARD SECURITY AND CONFIGURATION INTERFACE

[75] Inventors: Louis A. Cardillo, Palo Alto; Sandro H. Pintz, Menlo Park; Craig A. Nelson, Aptos; Landau F. Edouard, San Jose, all of Calif.

[73] Assignee: CagEnt Technologies, Inc., Santa Clara, Calif.

[21] Appl. No.: 08/841,118

[22] Filed: Apr. 29, 1997

Related U.S. Application Data

[60] Provisional application No. 60/017,005, Apr. 30, 1996.
[51] Int. Cl.⁶ .................................................. G06F 11/00
[52] U.S. Cl. ........................................................... 713/200
[58] Field of Search .............................. 395/186, 187.01, 395/188.01; 380/4, 25, 30

[56] References Cited

U.S. PATENT DOCUMENTS

| | | |
|---|---|---|
| 5,313,520 | 5/1994 | Han ............................................. 380/4 |
| 5,327,497 | 7/1994 | Mooney et al. ............................. 380/25 |
| 5,537,343 | 7/1996 | Kikinis et al. ......................... 364/708.1 |
| 5,594,227 | 1/1997 | Deo ........................................... 235/380 |

*Primary Examiner*—Robert W. Beausoliel, Jr.
*Assistant Examiner*—Pierre Eddy Elisca
*Attorney, Agent, or Firm*—Fenwick & West LLP

[57] ABSTRACT

Authentication mechanism for interactive home entertainment systems using plug-in cards which do contain software as well as cards which do not contain software. A security bit stream is generated by circuitry on the card and checked by the base system while the system is operating, but only a single signal line of the interface is used for the bit stream. The card also includes a ROM which contains data to be downloaded to the base system. The ROM data is downloaded to the base system via the same signal line of the interface as the serial bit stream. The signal line is used for ROM data download while the base system asserts a "reset" signal, and is used to carry the serial bit stream for authentication purposes whenever the reset signal is negated.

30 Claims, 7 Drawing Sheets

PERIPHERAL CARD SECURITY AND CONFIGURATION INTERFACE

CROSS-REFERENCE TO RELATED APPLICATIONS

This application claims the benefit of U.S. Provisional application Ser. No. 60/017,005, filed Apr. 30, 1996.

BACKGROUND

1. Field of the Invention

The invention relates to interfaces for interchangeable peripheral devices in computer apparatus, and more particularly, to an interface which allows both authenticity checking and configuration download while minimizing the physical and electrical differences with prior art interfaces.

2. Description of Related Art

It has become commonplace for hardware developers of interactive home entertainment systems to also develop and sell software for use with such systems, and/or to license other software vendors to do so in exchange for a royalty. In many situations the market for the software is highly lucrative, and indeed may be more important to the original hardware developer than sales of the base system. For the company that has invested heavily in the development of the initial product, the success of the venture may well depend upon the ability to successfully develop and market (or license others to develop and market) software useable with the base system. All too often, however, other vendors develop additional software for the product or even copy the proprietary software from the original manufacturer or a royalty-paying licensee, and capture the market for supplemental software, unburdened as they are with heavy development expenses in the hardware and initial software.

The problem of unlicensed software vendors is not limited to the simple usurpation of revenues which rightfully belong to the original developer of the system or a valid licensee, although that problem can be substantial by itself. There is also the additional problem that unlicensed software vendors do not work closely with the developer of the system and cannot be supervised as to the quality and true compatibility of their software. To the extent that unlicensed software vendors sell software which does not meet the quality and compatibility standards of the original developer, the product's reputation among the consumer public can suffer and the venture's success could be further undermined by reduced sales due solely to an unjustly damaged reputation.

A number of techniques have been developed to try to protect against the problems caused by unlicensed software vendors. For example, one technique requires that a predetermined secret code be included at a predetermined location in the software. Only the original system developer (and valid licensees, in some cases) know the code and/or the location at which it must appear. The host system checks for the code in the predetermined location before it will execute any software. In another technique, the code is checked periodically during the execution of the software in order to ensure that previously authenticated software is not removed and replaced by fraudulent software during execution. In yet another technique, the software contains a digest which is encrypted according to a data encryption key known only to the original system developer. (See U.S. Pat. Nos. 4,405,829, 4,200,770, 4,218,582 and 4,995,082, all incorporated by reference herein.) The system checks the encrypted digest either once or repeatedly during execution of the software.

As a separate matter, a large number of plug-in devices have been developed for the personal computer market. Such devices allow a user to enhance the functionality of a computer by adding additional equipment which is specific to the user's personal needs. Certain home entertainment systems also provide a plug-in port which users can use to enhance their systems in a similar manner. Such a capability allows each user to customize the product for his or her own purposes, without burdening the remainder of consumers with the expense of equipment they might not need for their own purposes. Such additional equipment useful for interactive home entertainment purposes might include non-volatile memory cards to store the current state of a game, for example, or various peripheral devices such as a modem or audio input/output devices. It might also include devices which contain ROM-stored data, such as game "personality modules."

If the additional equipment is sold separately from the base system, and is manufactured either by the same manufacturer as the base system or by other licensed and royalty-paying manufacturers, such equipment carries the same risks of unauthorized manufacture and sale as does software. The problem with respect to plug-in cards is exacerbated, however, because such devices do not necessarily contain software to be executed by the base system; the above-described authentication techniques involving secret codes or encrypted digests would not be appropriate for such devices. Thus a different authentication mechanism is needed if plug-in cards are to be protected from piracy.

Moreover, it is desirable to permit such plug-in cards to contain software to be executed by the base system. In this way a (licensed) software vendor can sell software to consumers either in the form of a CD-ROM (if the base system includes a CD-ROM player) or in the form of a plug-in card. A vendor would also be able to provide proprietary functions on a plug-in card, and include, on the same card, the low-level software drivers to be executed by the base system in order to operate such functions. While unlicensed manufacture and sale of plug-in cards can damage the developer of the original system in the same ways as described above, the potential that such cards can contain software to be executed by the base system would increase the danger of fraudulent activity greatly. A need therefore exists for an authentication mechanism for plug-in cards which will work whether or not the card contains software to be executed by the base system.

For software which is downloaded from a plug-in card prior to being executed by the base system, the above-described techniques involving secret codes or encrypted digests could provide adequate protection against fraudulent software distributed on plug-in cards. One of the advantages that card-distributed software has over CD-distributed software, however, is that the base system can be designed to allow card-distributed software to "execute-in-place" (XIP). That is, instead of downloading the software into the memory of the host system and then executing it from the host system's memory, it is desirable to permit the host system to retrieve an instruction from the card, execute it, retrieve the next instruction from the card, execute it, and so on. XIP capability allows the software to be executed without taking up space in the host system's memory.

But, allowing XIP creates yet another risk of fraudulent activity. For downloaded software, an authenticity check (such as encrypted digest authenticity check) can be performed once on the in-memory copy of the software after download, and need not be repeated on that software because it is thereafter known to be authentic and cannot be replaced by fraudulent software without detection. For XIP software, on the other hand, a single pre-execution authenticity check can be ineffective because schemes can often be devised for substituting fraudulent software after the initial check takes place. Repeated authenticity checks would therefore be advisable for XIP software. But since encrypted digest authenticity checking is a relatively time-consuming process, such repeated authenticity checks would introduce significant execution delays which may be noticeable to a user. At least the encrypted digest authentication mechanism would therefore be commercially impractical for protecting against fraudulent XIP software.

In the past, several video game systems were available for which software was sold in the form of plug-in cartridges. Authentication techniques were developed for such cartridges, and these techniques do not depend on the fact that the cartridge contained software to be executed by the base system. In one such technique, the connector through which the cartridge communicates electronically with the base system carries essentially a complete I/O bus, including address, data and control signal lines. The base system executes the software in the cartridge by performing read data access cycles on this bus, to retrieve the individual software instructions to be executed. Additionally, one contact on the connector is dedicated for carrying a serial bit stream from the cartridge into the base system, and another contact is dedicated for carrying another serial bit stream from the base system into the cartridge. Yet a third contact is dedicated to synchronizing the two bit streams. These three dedicated security-related signal lines are additional to the signal lines of the I/O bus. The base system and the cartridge also both contain identical "security devices", which generate the serial bit streams transmitted across the connector. The two serial bit streams are generated by sequential circuitry which is clocked by the same clock signal that is included in the control signal lines of the I/O bus. In the base system, the bit stream arriving from the cartridge is compared with the bit stream being generated locally, and as long as the two bit streams match, the base system is allowed to continue executing the software. If they fail to match, then execution is aborted. C.f. U.S. Pat. Nos. 4,799,635 and 5,004,232, both incorporated by reference herein in their entirety.

While the above technique can as a technical matter be used in systems where the cartridge is a functional unit such as a modem, and does not contain software to be executed by the base system, commercially the technique can be difficult to employ. The difficulty arises because many of the non-software-containing peripheral card functions which would be desirable for use with an interactive home entertainment system are usually designed primarily for one of the plug-in card interfaces which are standard in the personal computer industry. For example, many modems, non-volatile storage cards and other devices are designed for the standard connectors and signal specifications set forth in Personal Computer Memory Card International Association (PCMCIA), "PCMCIA Card Standard", Rel. 2.1 (July 1993) (hereinafter "PCMCIA Rel. 2.1 specification", incorporated by reference in its entirety herein). It would be expensive for a manufacturer to re-design such a device as a cartridge for use in an interactive home entertainment system which uses the authentication mechanism described above. The expense arises in part because the connector used in such a system must be of proprietary design in order to include the three dedicated security-related signal lines.

In summary, there is a need for an authentication mechanism which will protect a manufacturer from fraudulent sales of plug-in cards. The mechanism needs to be effective both for cards carrying functional peripheral units and for cards carrying only software to be executed by the host system, and needs to be effective even if such software is to be executed in place and not first downloaded to the host system's memory. Furthermore, the mechanism should minimize any physical and electrical deviations required from some standard interface for which peripheral units may already be designed. Encrypted digest techniques exist which would provide effective authentication for cards carrying software, but they provide no authentication for cards which do not carry software. They are also commercially undesirable for cards carrying XIP software. Security bit stream techniques also exist which can provide effective authentication for cards with or without software, but these techniques require proprietary interfaces which deviate significantly from standards for which peripheral units may otherwise be designed. No mechanism is currently available which can be used with peripheral cards whether or not they contain software to be executed by the base system, and which allows authenticity checking while minimizing the physical and electrical differences with prior art standard interfaces.

SUMMARY OF THE INVENTION

According to the invention, roughly described, a standard personal computer peripheral card interface such as the PCMCIA Rel. 2.1 interface is used in an interactive home entertainment system, and cards which do contain software as well as cards which do not contain software can be inserted into the interface. A security bit stream is generated by a small amount of additional circuitry on the card and checked by the base system while the system is operating, but only a single signal line of the interface is used for the bit stream and that signal line is otherwise undefined in the interface standard specification. All other signals in the interface comply with the interface standard specification. Thus a card which was originally designed for the standard interface specification can be adapted for use in the interactive home entertainment system merely by adding simple, inexpensive circuitry for generating the serial bit stream and connecting it to an otherwise unused signal line of the interface.

In another aspect of the invention, the additional circuitry includes a ROM which can be quite small in some embodiments, and which contains data to be downloaded to the base system. Such a ROM can contain such information as configuration data, a logo, or even computer instructions to be executed by the base system after downloading. The ROM data is downloaded to the base system via the same signal line of the interface as the serial bit stream, thereby avoiding any further variation of the interface from the standard interface. In one embodiment, the signal line is used for ROM data download while the base system asserts a "reset" signal via a standard interface signal line, and is used to carry the serial bit stream for authentication purposes whenever the reset signal is negated. The ROM data can further include its own encrypted digest, to further ensure authenticity of the card.

BRIEF DESCRIPTION OF THE DRAWINGS

The invention will be described with respect to particular embodiments thereof, and reference will be made to the drawings, in which.

DETAILED DESCRIPTION

Figure 1:
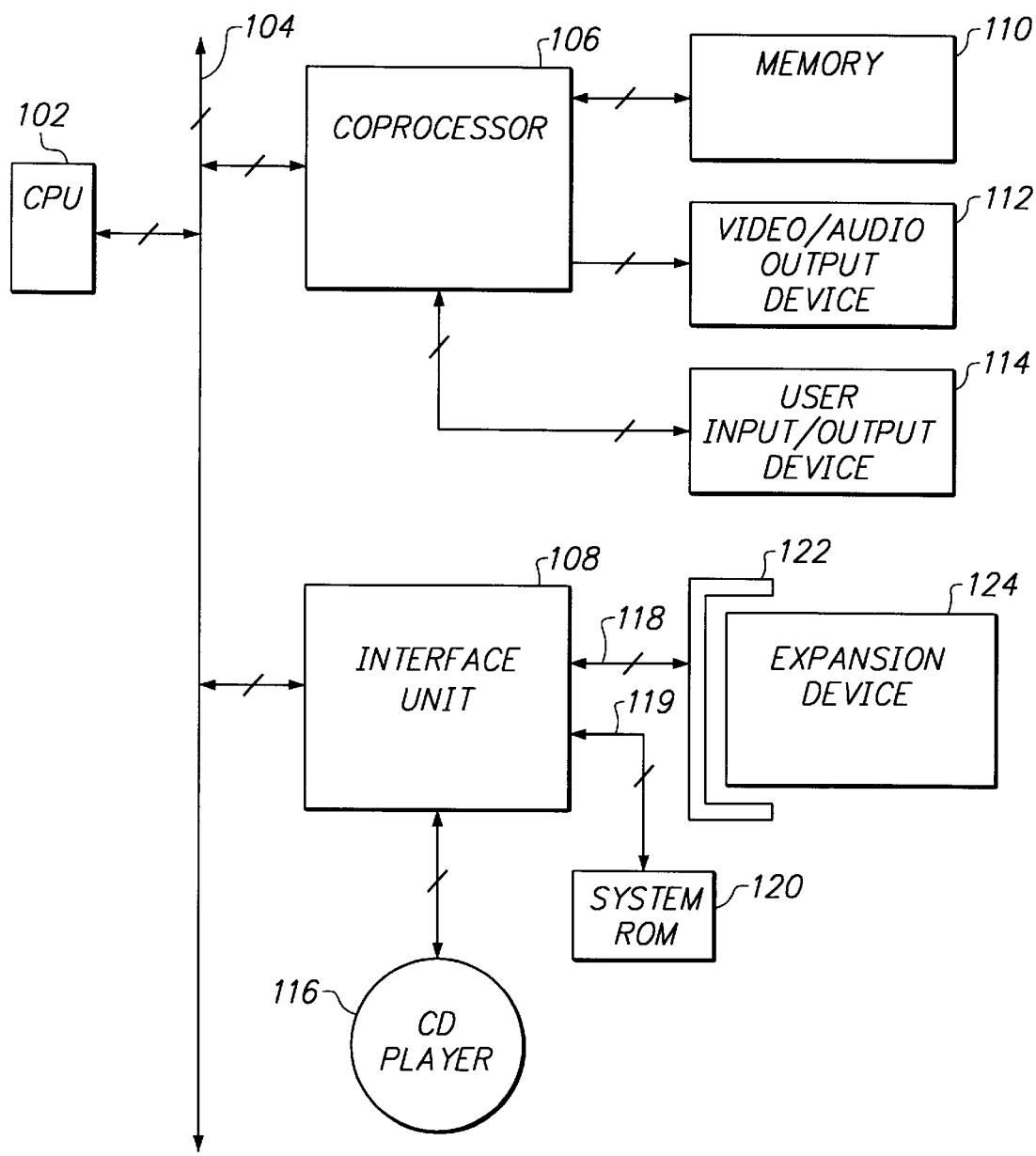
FIG. 1 is an overall block diagram of an interactive home entertainment system according to the invention.

FIG. 1 is an overall block diagram of an interactive home entertainment system according to the invention. While the present embodiment is described in terms of an interactive home entertainment system, it will be understood that the techniques of the invention can be used in other kinds of computer apparatus as well.

The system of FIG. 1 includes a CPU 102 which is connected to a CPU bus 104. Also connected to the CPU bus 104 are a coprocessor 106 and an interface unit 108. The coprocessor 106 is further connected to a memory 110, an audio/video output device (such as a television monitor) 112, and a user input/output device (such as a joy stick and/or 3-D glasses) 114. The interface unit 108 is connected to a CD player 116, and to an I/O bus 118. An expansion card socket 122 is connected to the I/O bus 118. A system ROM 120 is also connected to the interface unit 108 via a bus 119; the buses 118 and 119 share their address and data lines but have separate control lines.

The coprocessor 106 contains a variety of functional units, including an interface to the memory 110, a triangle engine for generating graphic images in a display buffer in the memory 110, a video postprocessor and digital video encoder for converting frame buffer images for output on the audio/video output device 112, a digital signal processor for creating and manipulating sounds, an MPEG decoder for processing moving images, and a controller for the user input/output device 114.

The interface unit 108 also contains a variety of functional units, including an interface to the CD player 116 and interfaces to the I/O bus 118 and the bus 119. As described in more detail below, the interface unit 108 also contains circuitry for receiving configuration data downloaded via the expansion port 122, for checking a serial bit stream received from the expansion port 122, and for disabling the expansion port 122 in the event of an authenticity check failure.

The expansion port 122 is fully compatible, both physically and electrically, with the above-incorporated PCMCIA Rel. 2.1 specification, with the exception that one of the pins on the socket which is designated in the specification as having been reserved for future use (RFU), is used to carry a security bit stream from the port to the interface unit 108. (A second RFU pin is also used to carry a clock signal, but the clock signal is not used for security in the present embodiment.) A second expansion port (not shown), identical to expansion port 122, can also be connected to the I/O bus 118.

Also shown in FIG. 1 is an expansion device 124 which is plugged into the expansion port 122. The expansion device can be, for example, a modem card, a non-volatile memory card, an audio input/output device, or a card containing games software to be executed in place. By using an interface which is similar that of the PCMCIA Rel. 2.1 standard, the system of FIG. 1 takes advantage of the market volume and competition driving the PCMCIA Rel. 2.1 standard. Expansion cards 124 are able to use standard connectors, packaging and components that are already widely available for PCMCIA Rel. 2.1 cards. Card products designed originally for the personal computer market can be evolved into peripheral cards for the system of FIG. 1 with relative ease. (Note that the ability to take advantage of the market value and competition driving the PCMCIA Rel. 2.1 standard does not require that cards designed for the personal computer market be directly usable in the system of FIG. 1, nor does it require that cards designed originally for the system of FIG. 1 be directly usable with a personal computer. Even in those cases where the hardware may be nearly identical, substantial software compatibility issues may remain. However, for any PCMCIA card that will physically fit into the socket 122, the socket 122 and interface unit 108 are wired such that no electrical damage can take place to either the host system of FIG. 1 or the PCMCIA card.)

Figure 2:
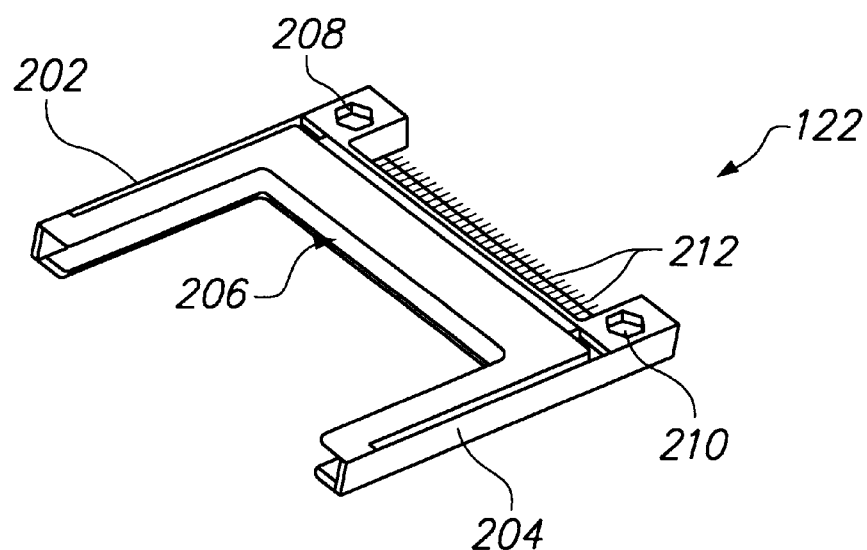
FIG. 2 is a perspective view of the socket of FIG. 1.

FIG. 2 is a perspective view of the socket 122 (FIG. 1). It is mechanically compatible with the PCMCIA Rel. 2.1 sockets that accept Type I, Type II and Type III PCMCIA cards. The socket comprises two side guide rails 202 and 204 which guide the expansion card 224 as it is being inserted into the socket 122. When fully inserted, the card 124 engages a 68-pin female connector 206 having two rows of 34 pins each. The connector is keyed to ensure that the card is not inserted upside down. The socket 122 is physically attached to the interface unit 108 via mounting holes 208 and 210, and electrically by connection to the pins 212 of the connector 206.

Figure 3:
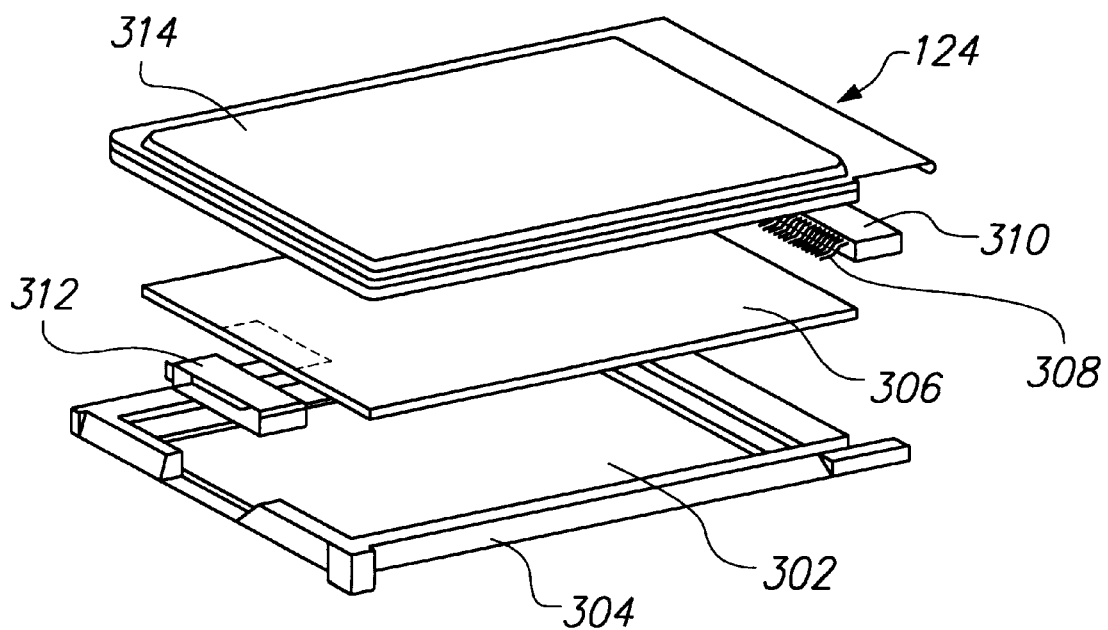
FIG. 3 is an exploded perspective view of the expansion device of FIG. 1.

FIG. 3 is an exploded perspective view of the expansion device 124. It comprises a bottom cover 302 which is mounted within a card frame 304. A printed circuit board 306 carries the electrical functions of the card, and is mechanically and electrically connected to the pins 308 of a male PCMCIA Rel. 2.1-compatible connector 310 on one end of the card 124. In one embodiment of an expansion card 124, a separate I/O connector 312 is mechanically and electrically attached to the printed circuit board 306 at the opposite end of the card 124, for connection to further devices. In other embodiments, the I/O connector 312 is omitted. The card 124 further has a top cover 314. When inserted into the card socket 122, the PCMCIA Rel. 2.1 connector 310 engages the connector 206 (FIG. 2), making firm electrical contact therewith.

Figure 4:
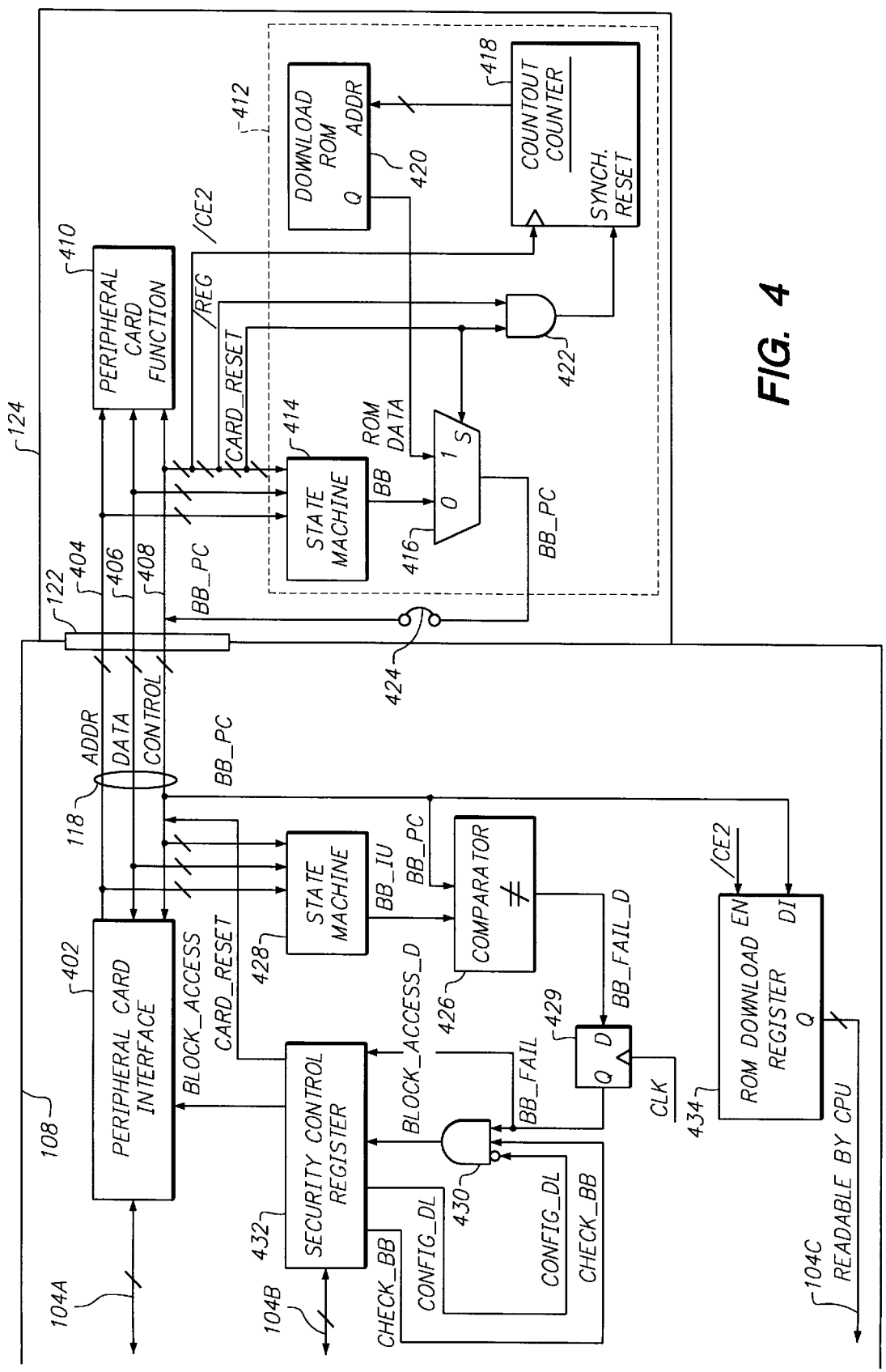
FIG. 4 is a block diagram detail of the interface between the interface unit and the expansion device in FIG. 1.

FIG. 4 is a block diagram showing more detail of the interface between interface unit 108 and expansion device 124 of FIG. 1. Referring to FIG. 4, the interface unit 108 includes a peripheral card interface 402, which provides a bridge between the CPU bus 104 and the I/O bus 118. The peripheral card interface 402 is shown in FIG. 4 as being connected to a bus 104A, but it will be understood that additional interface circuitry (not shown) couples the bus 104A to the CPU bus 104 (FIG. 1). The I/O bus 118, as illustrated in FIG. 4, includes 26 address and 16 data leads 404 and 406, respectively, and further includes control leads 408. The interface also includes a number of power and ground leads (not shown). The control leads are defined as follows. (A slash (/) preceding a signal name indicates that the signal is asserted low.)

Card Enables (/CE1, /CE2). Active low inputs from interface unit 108. /CE1 enables even numbered address bytes and /CE2 enables odd numbered address bytes. For 16-bit wide data access to the expansion card 124, the interface unit 108 asserts both chip enables together. For 8-bit wide data access to expansion card 124 using D(7:0), the interface unit 108 asserts only /CE1 (A0 selects odd or even byte). For 8-bit wide data access to odd bytes only in the interface unit 108, using D(15:8), the expansion device 124 asserts only /CE2. In the system of FIG. 1, these chip enable signals also provide certain clocking functions as described hereinafter.

Output Enable (/OE). Active low signal from interface unit 108 used to gate memory read data from the expansion device 124.

Write Enable (/WE). Active low signal from interface unit 108 for strobing memory write data into an address on expansion card 124.

Card Detects (/CD1, /CD2). These signal lines allow the interface unit 108 to detect a properly inserted expansion card 124. The signal pins are at opposite ends of the connector 206 (also 310) to ensure that both sides of a card are firmly inserted. The two signals are connected to ground internally on the expansion card 124 and are pulled up with resistors to Vcc in the interface unit 108.

Write Protect (WP). This signal output from the expansion device 124 reflects the status of the device's write-protect switch, if present. If not present, then this signal line is connected high or low in the expansion device depending on the desired operation.

Attribute Memory Select (/REG). When asserted, the interface unit 108 is accessing attribute memory (/OE or /WE asserted) or the I/O address space (/IORD or /IOWR asserted). Attribute memory is a separately accessed section of the memory space supported on expansion device 124 and is generally used to record card capacity and other configuration and attribute information. Attribute memory is also used to access standardized card configuration registers. I/O space is used for access to peripheral expansion devices 124 via the /IORD and /IOWR strobe signals. As described in more detail below, /REG is used for a different purpose when CARD_RESET is asserted.

Card Reset (CARD_RESET). The PCMCIA Rel. 2.1 specification defines a RESET signal which is typically the same as a system-wide reset signal. According to the specification, this signal, when asserted by interface unit 108, should cause the expansion device 124 to return to an unconfigured state. It also signals the beginning of any additional card initialization procedure. On the expansion device 124, the CARD_RESET signal performs these same functions, but when asserted additionally causes the card to enter a ROM download mode as described in more detail below. When CARD_RESET is negated, the security bit stream is enabled. In the embodiment of FIGS. 1 and 4, CARD_RESET is different from any system-wide reset signal and can be asserted independently thereof.

Extend Bus Cycle (/WAIT). This signal is asserted by an expansion card 124 to delay completion of a memory access or I/O access then in progress.

I/O Read (IORD). Asserted by interface unit 108 to read data from the card 124 I/O space. /REG and at least one of /CE1 or /CE2 must also be active for the I/O transfer to take place.

I/O Write (IOWR). This signal is asserted by interface unit 108 in order to write data into the card 124 I/O space. /REG and at least one of /CE1 or /CE2 must also be active for the I/O transfer to take place.

Interrupt Request (/IREQ). Asserted by expansion card 124 to indicate to the host system that the card 124 requires host software service.

Additional Signals. The control leads also include certain additional signals which are not part of the standard PCMCIA Rel. 2.1 signal definition, but rather they are implemented as a custom extension to the PCMCIA Rel. 2.1 standard. The signals follow the protocol defined in such standard for custom extensions, and therefore do not constitute deviations from the standard.

Clock (CLK). The PCMCIA Rel. 2.1 specification does not define any clock signal passing between the host system and the PCMCIA expansion card. The system of FIG. 1 deviates the PCMCIA Rel. 2.1 specification by providing a clock signal from the interface unit 108 on a pin designated RFU in the PCMCIA Rel. 2.1 specification. However, as will be seen, this signal is not used at all in the authenticity mechanism in the system of FIG. 1.

Serial Bit Stream (BB_PC). This signal from expansion card 124 carries a serial bit stream whose meaning differs depending on the state of CARD_RESET. When CARD_RESET is asserted, BB_PC carries configuration data downloaded from a ROM on the expansion device 124. When CARD_RESET is negated, BB_PC carries a security bit stream as described in more detail below.

Returning to FIG. 4, the I/O bus 118 is coupled via the I/O port 122 to a peripheral card function 410 in the expansion card 124. The peripheral card function 410 can be a memory array, a modem, or any other peripheral function. The circuitry in peripheral card function 410 can be the same as that provided on a standard PCMCIA Rel. 2.1 peripheral card to perform the same function. The expansion card 124, however, also includes certain additional circuitry 412 which is not present on a standard PCMCIA Rel. 2.1 card. The additional circuitry comprises a state machine 414 which is connected to receive certain address, data and control signals from the I/O bus 118. State machine 414 has a single output, BB, which is provided to the '0' input port of a two-input multiplexer 416, the output of which is designated BB_PC. The /CE2 control signal line from bus 118 is connected to the clock input of an address counter 418, the count output of which is connected the address input of a download ROM 420. The download ROM 420 has a one-bit-wide output Q, which is connected to the '1' input port of multiplexer 416. The select input of multiplexer 416 is connected to receive the CARD_RESET control signal from the bus 118. The CARD_RESET signal is also connected to one input of a two-input AND gate 422, the other input of which receives /REG from the bus 118. The output of AND gate 422 is connected to a synchronous reset input of the address counter 418.

The BB_PC output of multiplexer 416 is not connected directly to the BB_PC control signal line of the bus 118, but rather is connected via a jumper 424. When jumper 424 is connected, the expansion card 124 can be used with the system of FIG. 1. It should not be used in a standard PCMCIA Rel. 2.1 socket, however, since the BB PC signal violates the PCMCIA Rel. 2.1 specification by making an electrical connection to an RFU pin. The violation can be avoided simply by opening the jumper 424, thereby enabling the expansion card 124 to be used in a standard PCMCIA Rel. 2.1 socket.

The state machine 414 is responsible for generating a security bit stream on its output signal line BB. The security bit stream should preferably be difficult to duplicate without duplicating the entire state machine 414 itself. One technique which can be used to increase the difficulty of duplication is to include one or more of the address and/or data bits from the bus 118 in the calculation of either BB or of the next state in the state machine 414, or both. This technique minimizes the risk that a pirate can produce a card 124 which simulates the BB signal using a simple ROM/counter combination in place of the state machine 414. Because the interface unit 108 is able to access the card 124 in half-word transactions, preferably at least one data bit from each of the low and high halves of the data bus 406 are included in the calculation. In the state machine 414, the data bits used in the calculation are updated in response to each new read access which the peripheral unit 108 performs over the I/O bus 118.

Figure 5:
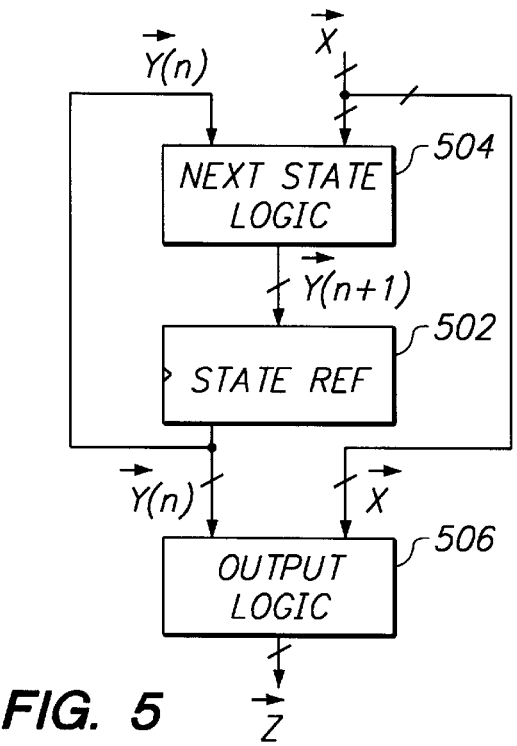
FIG. 5 is a block diagram of a generalized state machine.

FIG. 5 illustrates a generalized state machine 414. It comprises a state register 502, the output of which carries one or more "current state" bits. Using vector notation, for the n'th state, the output of state register 502 is represented as $\vec{Y}(n)$. $\vec{Y}(n)$ is fed back to the input of purely combinational next state logic 504, which also receives a state machine input vector represented in FIG. 5 as $\vec{X}$. In the state machine 414, $\vec{X}$ includes the above-mentioned at least one data bit from each of the low and high halves of the data bus 406. The output of combinational next state logic 504 is a "next state" vector for the state register 502, and is designated in FIG. 5 as $\vec{Y}(n+1)$. The current state vector $\vec{Y}(n)$ is also connected to the input of purely combinational output logic 506, which also receives the input vector $\vec{X}$. The output of output logic 506 forms the output of the state machine, and is represented in FIG. 5 by the output vector $\vec{Z}$. In the state machine 414 (FIG. 4), $\vec{Z}$ is solely the BB signal.

In state machine 414, the state register is updated in response to either /CE1 or /CE2. The clock signal CLK on the bus 118 is not used in the clocking of state machine 414, and is not in fact used at all in the authentication mechanism of the system of FIG. 1.

The output vector $\vec{Z}$ is referred to herein as being "responsive" to the input vector $\vec{X}$. This does not mean that every value in the output sequence must depend on the input sequence; only that at least some of the values in the output sequence would be different if the input is different.

It will be appreciated that the diagram of FIG. 5 represents only a generalized state machine within which the state machine 414 can be implemented. The exact state machine used in a given embodiment is unimportant for an understanding of the invention. It will also be appreciated that the generalized state machine of FIG. 5 includes all of its degenerate forms. For example, any of the vectors shown in the figure could in a given embodiment constitute only a single signal. As another example, the next state logic 504 need not actually use all of the signals provided to it in order to calculate $\vec{Y}(n)$, and any signal not actually used, will in a typical integrated circuit chip not even be provided to the next state logic 504. Similarly, output logic 506 need not actually use all of the signals provided to it in order to calculate $\vec{Z}$. The next state logic 504 and/or the output logic 506 might also include a simple passthrough of one or more of its input signals to its output. As used herein, a combinational circuit is a circuit whose output is a function only of its then-current inputs. A sequential circuit is a circuit whose output depends at least in part on prior inputs.

It will be appreciated further that the state machine 414 can be implemented using a variety of different kinds of circuits. For example, state-maintaining portions of the state machine can be implemented using counters (whether synchronous or ripple), and/or combinational portions can be implemented using one or more ROMs.

The download ROM 420 contains certain configuration information. It can also contain such other items as artwork and/or software to be executed by the host system. The ROM data is organized into 32-bit long words of information, shifted out serially through the ROM's one-bit wide output. According to an aspect of the invention, the serial ROM data is downloaded serially over the same BB_PC signal line as is the security bit stream produced by the state machine 414; CARD_RESET determines which bit stream will be provided on BB_PC at any given time.

The download ROM 420 contains, among other things, an indication of the number of words of data to be downloaded from the ROM. In another aspect of the invention, part or all of the data in download ROM 420 can be protected by a digital signature (encrypted digest), which is also stored in the ROM. It will be appreciated that because any software instructions included in this data will not be executed in place, but rather can be executed by the host system only after having been downloaded into the host system's memory 110, a single check of the encrypted digest is sufficient to ensure the authenticity of such software.

In the interface unit 108, the BB_PC signal is connected to one input of a comparator 426. The comparator 426 may be an exclusive OR gate. The other input of comparator 426 is connected to a BB_IU signal output from another state machine 428. The state machine 428 is connected to receive the same signals from the bus 118 as are provided to state machine 414 in the expansion card 124, and provides the same security bit stream output on BB_IU as the state machine 414 provides on BB. The "current state" in the two state machines is synchronized to start from the same predetermined state in response to the CARD_RESET signal provided. No separate synchronization signal is required through the port 122.

The comparator 426 has a '1' output designated BB_FAIL_D which, when asserted, indicates that the security bit stream output from state machine 428 and the signal on BB_PC do not match. BB_FAIL_D is connected to the D input of a flip-flop 429, the Q output of which is connected to a non-inverting input if a 3-input AND gate 430. A second non-inverting input to the AND gate 430 is connected to receive the value of a CHECK_BB bit from a security control register 432, and an inverting input to the AND gate 430 is connected to receive the value of a CONFIG_DL signal from the security control register 432. The security control register 432 is readable and writable by the CPU 102 (FIG. 1) via the CPU bus 104 and bus 104B (FIG. 4). The output of AND gate 430 is connected to the D input of a BLOCK_ACCESS bit of the security control register 432. The value of the BLOCK_ACCESS bit of security control register 432 is provided to the peripheral card interface 402 and, when asserted, prevents the peripheral card interface 402 from issuing any further access cycles on the I/O bus 118 until some predefined correcting event occurs (such as a power-down and re-start of the system). The security control register 432 also includes a CARD_RESET bit which drives the CARD_RESET signal line of the bus 118; thus, the CPU 102 can assert CARD_RESET by writing a logic 1 into the appropriate bit of the security control register 432, and can negate CARD_RESET by writing a logic 0 into such bit. The security control register 432 also receives and stores BB_FAIL from the output of the flip-flop 429.

The BB_PC signal from the bus 118 is also connected to the serial data input of a ROM download shift register 434 in the interface unit 108. Shifting is enabling by /CE2 and clocked by the system clock. The 32-bit parallel output of the ROM download shift register 434 is readable by the CPU 102 via the bus 104C and the CPU bus 104 (FIG. 1). As with the bus 104A, an interface (not shown) exists which couples the busses 104B and 104C with the CPU bus 104.

Figure 6:
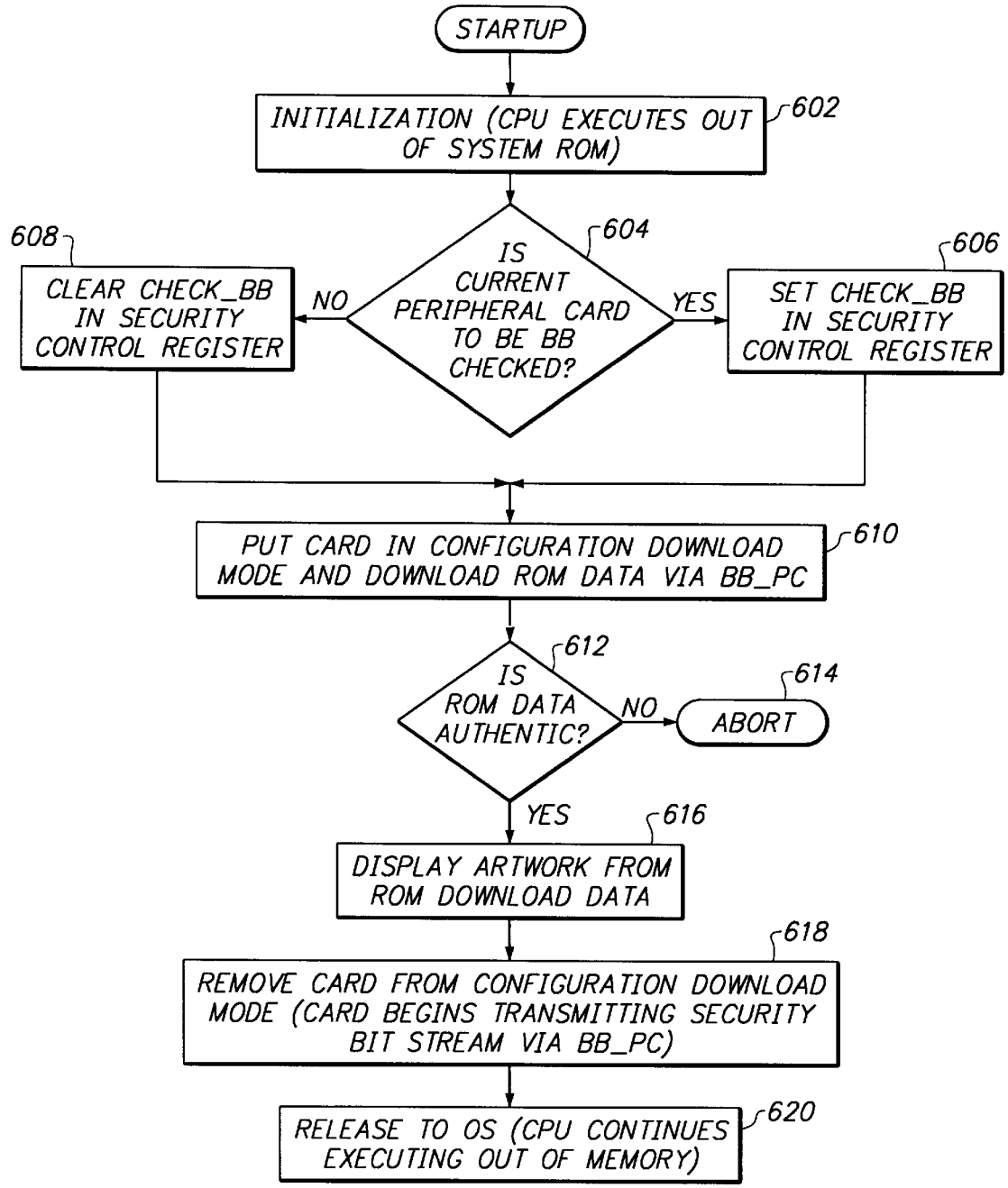
FIG. 6 is a flow chart illustrating the sequence of pertinent events which take place when the system of FIG. 1 is powered-up.

The operation of the system of FIGS. 1 and 4 will now be described with respect to the flow charts of FIGS. 6–10, which illustrate the sequence of pertinent events which take place when the system is powered up with an expansion card 124 inserted in the expansion port 122. Referring to FIG. 6, on power-up, the system begins executing out of system ROM 120 (FIG. 1). In step 602, the system performs various initialization functions which are not important to an understanding of the invention. In a step 604, the system detects the presence of an expansion device 124 in the port 122 and determines whether the security bit stream produced by this particular expansion device 124 is to be checked. If so, then in step 606, the system sets the CHECK_BB bit in the security control register 432. If not, then in step 608, the system clears the CHECK_BB bit in the security control register 432. In either case, in step 610, the system CPU 102 puts the expansion device 124 in its configuration download mode and downloads the data from download ROM 420 via the BB_PC signal line. The details of step 610 are described in more detail hereinafter.

As mentioned, in an aspect of the invention, the data downloaded from download ROM 420 can be protected by an encrypted digest. Therefore, in step 612, the system determines from the encrypted digest whether the data is authentic. If not, the system aborts (step 614). If so, then execution out of system ROM 120 continues with the system displaying the artwork that was download from download ROM 420 (step 616). In step 618, the CPU removes the expansion device 124 from its configuration download mode, causing the expansion card to begin transmitting its security bit stream via the same BB_PC signal wire, and in step 620, the system releases to the operating system and the CPU continues executing, eventually out of memory 110.

Figure 7:
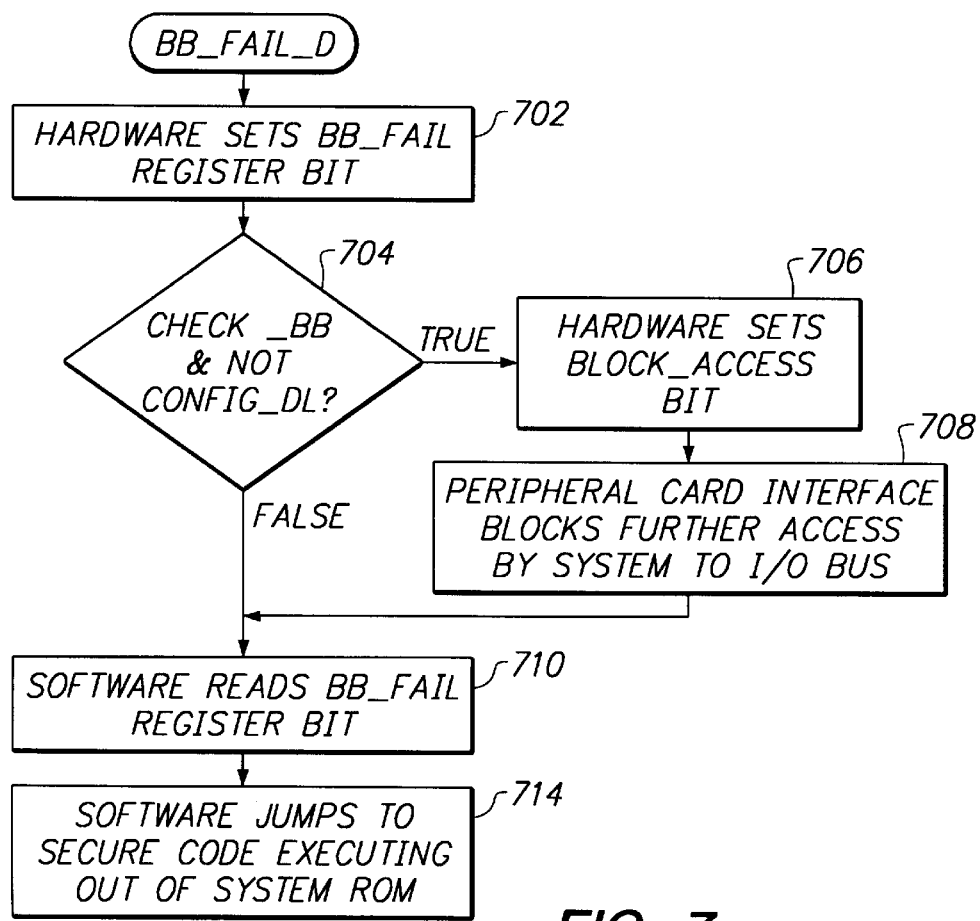
FIG. 7 is a flow chart illustrating the operation of the system in the event that the security bit stream arriving from the peripheral card in FIG. 4 fails to match the bit stream being generated by the state machine in FIG. 4.

FIG. 7 is a flow chart illustrating the operation of the system in the event that the security bit stream arriving from the peripheral card 124 fails to match the bit stream being generated by state machine 428 (FIG. 4). In a step 702, the hardware of interface unit 108 first sets the BB_FAIL register bit 429. In a step 704, the hardware (via AND gate 430) determines whether CHECK_BB has been set and confirms that the system is no longer in the configuration download mode. If both conditions are true, then in step 706, the hardware sets the BLOCK_ACCESS bit in the security control register 432. In step 708, the peripheral card interface 402, in response to BLOCK_ACCESS asserted, blocks all further access by the system to the I/O bus 118 (the system ROM 120 remains accessible).

Whether or not BLOCK_ACCESS has been asserted, in step 710, the software eventually reads the BB_FAIL register bit 428 from the security control register 432 and determines that it has been set. In step 714, in response to detecting BB_FAIL asserted, the software jumps to secure code executing out of the system ROM 120. The system then either aborts or takes appropriate measures to ensure that the expansion card 124, now known to be fraudulent, cannot be used in the system.

Figure 8:
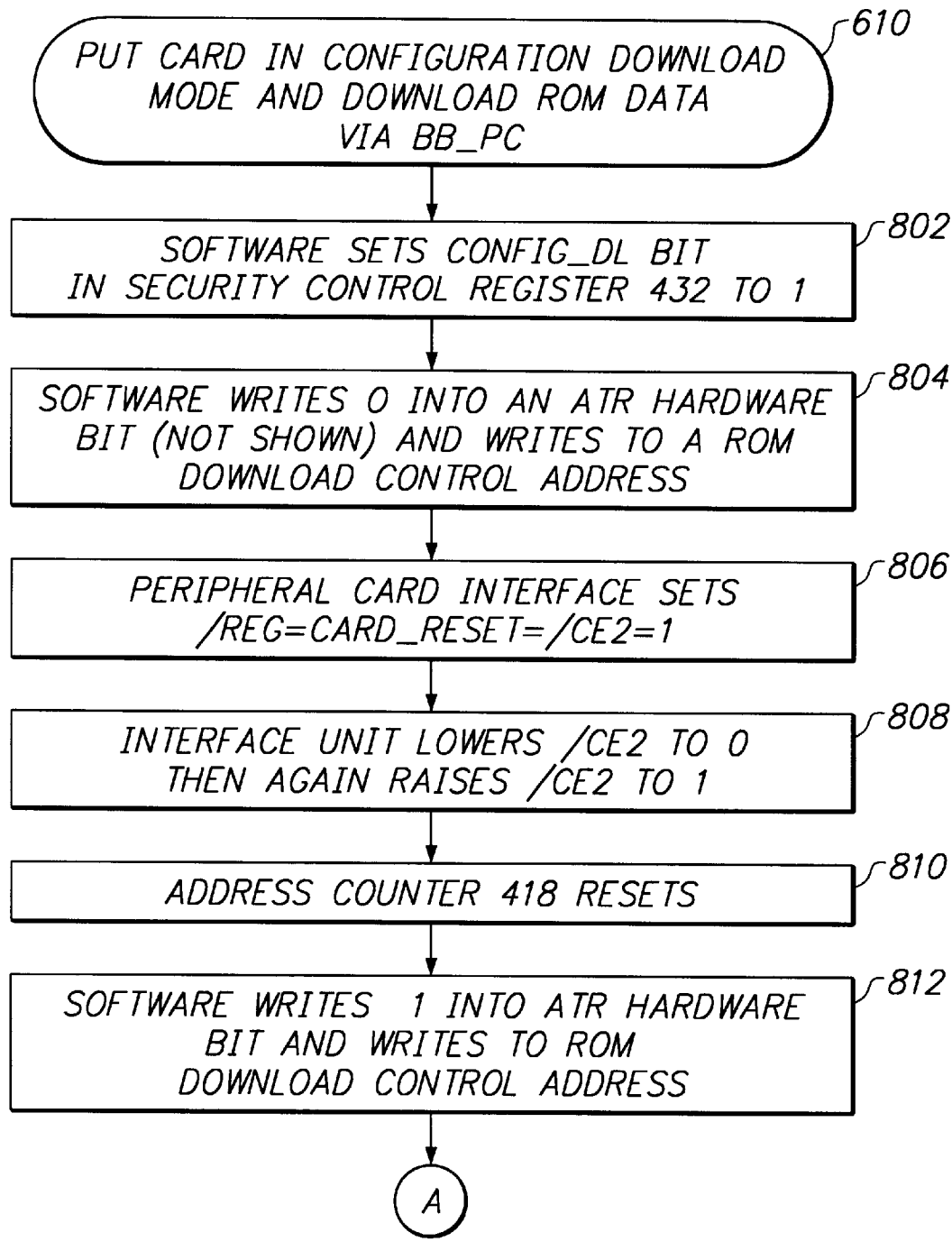
FIGS. 8 and 9 together constitute a flow chart of the step in FIG. 6 of putting the card in the configuration download mode and downloading ROM data, with FIG. 9 being a continuation of FIG. 8.
Figure 9:
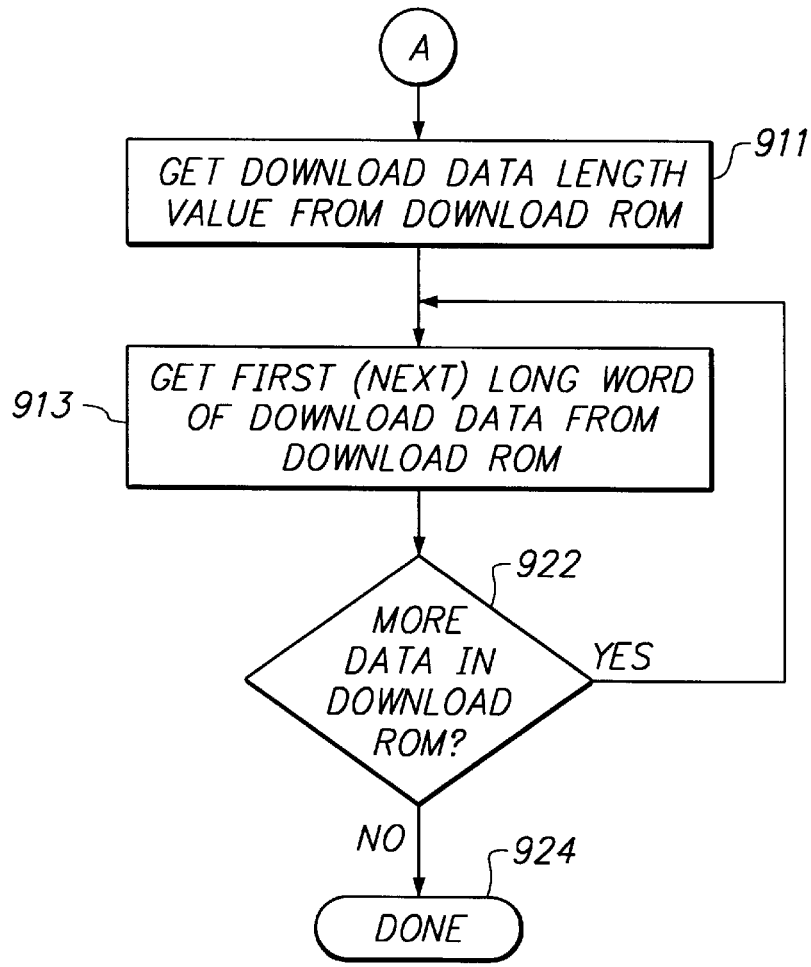

FIGS. 8 and 9 together constitute a flow chart of the step 610 (FIG. 6), that is, the step of putting the card in the configuration download mode and downloading the ROM data. In a step 802, the software (still executing out of system ROM 120) sets the CONFIG_DL bit in the security control register 432 to 1. In step 804, the software writes a logic 0 into an ATR hardware bit (not shown) in the interface unit 108 and writes dummy data to a predefined ROM download control address. In response, in step 806, the peripheral card interface 402 sets /REG, CARD_RESET and /CE2, all to a logic 1. In step 808, the interface unit 108 then lowers /CE2 to a logic 0 and then again raises /CE2 to a logic 1. Two rising edges of /CE2 are needed to fully reset the address counter 418 (FIG. 4). In response, in step 810, the address counter 418 resets.

In order to download data from the download ROM 420, the software writes a logic 1 into the ATR hardware bit, and again writes dummy data to the ROM download control address. In response, the peripheral card interface 402 lowers /REG to a logic 0, leaves CARD_RESET=1, and issues 33 cycles of /CE2 (the first cycle is ignored). In response to the 33 cycles of /CE2, the hardware transmits a 32-bit long word from the download ROM 412 via BB_PC to the ROM download register 434, and sets a ready bit (not shown) in the interface unit 108. The software then reads the long word from the ROM download register 434 and clears the ready bit.

Using this procedure, in step 911 (FIG. 9), the software obtains the download data length value from the download ROM 420. In step 913, the software obtains the first long word of ROM download data. In step 922, the software decrements its count of the number of long words in the download ROM 420, and if >0, loops back to step 913 to download the next long word. If not, then the ROM data download process is complete (step 924).

Figure 10:
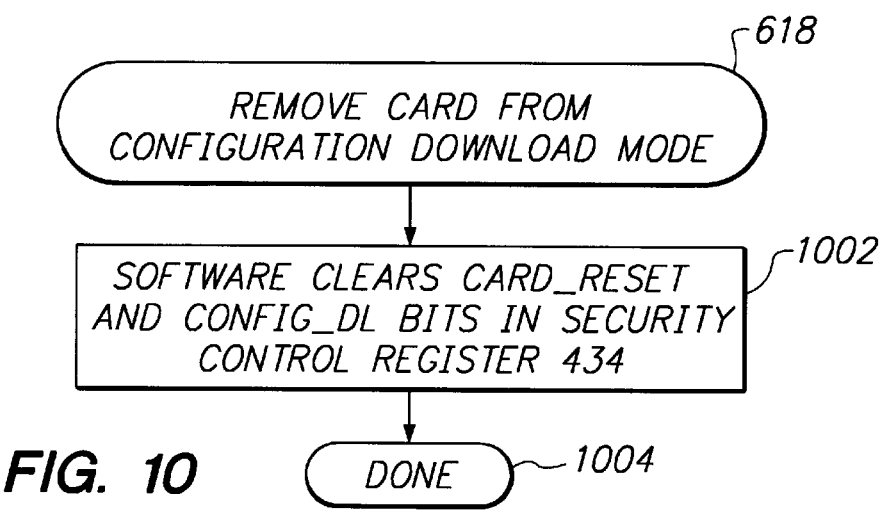
FIG. 10 is a flow chart of the step in FIG. 6 of removing the card from the configuration download mode.

FIG. 10 is a flow chart of step 618 (FIG. 6), specifically the step of removing the card from the configuration download mode. It comprises the single step 1002 in which the software clears the CARD_RESET and CONFIG_DL bits in the security control register 434. Thereafter, the card is removed from its configuration download mode (step 1004).

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. Peripheral apparatus for use with a base unit, comprising:
    a connector via which said peripheral apparatus is attachable to said base unit, said connector carrying a plurality of signal lines forming a bus, one of said signal lines carrying a security output from said peripheral apparatus;
    a code production unit having a code output, said code production unit producing a security code on said code output as a serial bit stream at least during authenticity check times;
    a source of download data, having a data output; and
    output circuitry coupled to said code output and said data output, said output circuitry coupling said code output to said security output data line during said authenticity check times and coupling said data output to said security output data line during times other than said authenticity check times.

2. Apparatus according to claim 1, wherein said bus further includes a reset signal line carrying a reset signal to said peripheral apparatus, and wherein said output circuitry is coupled to said reset line and couples said code output to said security output data line when said reset signal is negated and couples said data output to said security output data line when said reset signal is asserted.

3. Apparatus according to claim 2, wherein said reset line is also coupled to said code production unit, said code production unit resetting to a predetermined state in response to assertion of said reset signal.

4. Apparatus according to claim 2, wherein said source of download data comprises:

a ROM having an address input and said data output;

an address counter having a count output coupled to said ROM address input, and further having a reset input; and counter reset circuitry coupled to receive said reset signal and a memory select signal from said bus, and having an output coupled to said reset input of said counter, said counter reset circuitry resetting said counter in response to assertion of said reset signal together with said additional signal being at a predetermined logic level.

5. Apparatus according to claim 1, wherein said bus includes address lines, data lines and control lines, wherein said code production unit is coupled to said bus including at least a particular one of collectively said address and data lines, said code production unit producing said security code as a predetermined function of a sequence of signals received from said bus, said security code being responsive at least to said particular signal.

6. Apparatus according to claim 5, wherein said bus carries data access cycles generated by said base unit, further comprising a peripheral card functional unit coupled to said bus which responds to at least a subset of said data access cycles.

7. Apparatus according to claim 5, wherein said bus carries data access cycles generated by said base unit, including data read accesses directed to said peripheral apparatus, further comprising a peripheral card functional unit coupled to said bus which drives data onto said data lines of said bus in response to at least a subset of said data read accesses.

8. Apparatus according to claim 1, wherein said source of download data comprises a ROM.

9. Apparatus according to claim 8, wherein said ROM includes an address input and said data output, said source of download data further comprising an address counter having a count output coupled to said address input of said ROM, said address counter being further coupled to said bus to increment said count output in response to each cycle on one of said signal lines on said bus at least during ROM download times.

10. Apparatus according to claim 9, wherein said bus includes a clock signal line different from said one of said signal lines.

11. Apparatus according to claim 9, further comprising said base unit.

12. Apparatus according to claim 9, further comprising said base unit, said base unit comprising:

a shift register having a serial input coupled to said security output data line; and clocking circuitry coupled to said bus and to said shift register, said clocking circuitry clocking said shift register in response to each cycle on said one of said signal lines during said ROM download times.

13. Apparatus comprising a base unit, a peripheral unit, and a bus coupling said base unit to said peripheral unit, said bus including a plurality of bus signal lines including address lines, data lines and control lines, said base unit including:
a source of data access cycles communicated to said peripheral unit via said bus;
a first code production unit coupled to receive signals from said bus and having a first code output; and
a comparator having a first input coupled to receive said first code output and further having a second input and an output, said peripheral unit including:
a peripheral card functional unit coupled to receive said access cycles via said bus;
a second code production unit coupled to receive signals from said bus and having a second code output; and
output circuitry coupled to receive said second code output and further having an output coupled to said second input of said comparator in said base unit, said output circuitry coupling said second code output to said second input of said comparator at least during authenticity check times, wherein said first code production unit is arranged to produce a first code sequence on said first code output as a first predetermined function of a sequence of the signals received from said bus, said first code sequence being responsive to at least a particular signal from collectively said address and data lines, wherein said second code production unit is arranged to produce a second code sequence on said second code output as a second predetermined function of a sequence of the signals received from said bus, said second code sequence being responsive at least to said particular signal from collectively said address and data lines, and wherein said second predetermined function is such that said second code sequence matches said first code sequence when the sequence of signals received from said bus by said second code production unit matches the sequence of signals received from said bus by said first code production unit.

14. Apparatus according to claim 13, wherein said second code production unit comprises a sequential state machine which includes:

a second state register having a second current state output, a second next state input, and a second clock input in response to which said second state register updates said second current state output to values responsive to said second next state input;

second combinational next state logic having inputs coupled to receive at least one signal from collectively said bus and said second current state output, and further having outputs coupled to said second next state input;

second combinational output logic having inputs coupled to receive at least one signal from collectively said bus and said second current state output, and further having an output being said second code output.

15. Apparatus according to claim 14, wherein said first code production unit also comprises a sequential state machine which includes:
- a first state register having a first current state output, a first next state input, and a first clock input in response to which said first state register updates said first current state output to values responsive to said first next state input;
- first combinational next state logic having inputs coupled to receive at least one signal from collectively said bus and said first current state output, and further having outputs coupled to said first next state input; and
- first combinational output logic having inputs coupled to receive at least one signal from collectively said bus and said first current state output, and further having an output being said first code output.

16. Apparatus according to claim 14, wherein said second code production unit further comprises combinational clocking logic having an input port coupled to a subset of said control signal lines, and having an output coupled to said second clock input of said second state register.

17. Apparatus according to claim 16, wherein said control signal lines include a clock signal line, and wherein said clock signal line is not coupled to said combinational clocking logic.

18. Apparatus according to claim 14, wherein said second code production unit further comprises clocking circuitry coupled to said bus and to said second clock input of said second state register, said clocking circuitry clocking said second state register no more than once in response to each of said data access cycles.

19. Apparatus according to claim 13, wherein said comparator comprises only combinational circuitry.

20. Apparatus according to claim 13, wherein said comparator comprises an inequality detector.

21. Apparatus according to claim 13 further comprising means coupled to said output of said comparator for, in response to a non-match indicated on said output of said comparator, inhibiting said source of data access cycles from initiating further data access cycles until a predefined correcting event occurs.

22. Apparatus according to claim 13, wherein said particular signal is a signal from said data lines.

23. Apparatus according to claim 13, wherein said particular signal is a signal from said address lines.

24. Apparatus according to claim 13, wherein said bus includes a connector by which said peripheral unit is physically and detachably attached to said base unit.

25. Apparatus according to claim 24, wherein said output circuitry comprises a conductor connecting said peripheral unit to said base unit through said connector.

26. Apparatus according to claim 13, wherein said output circuitry comprises a multiplexer having a first input port coupled to said second code output and further having an output coupled to said second input of said comparator in said base unit, said multiplexer further having a second input port and a select input, and wherein said peripheral unit further comprises:
- a source of download data coupled to said second input port of said multiplexer; and
- means coupled to said select input of said multiplexer, for causing said multiplexer to select said first input port during authenticity check times.

27. Apparatus according to claim 13, wherein said control signal lines include a card reset signal line,
- wherein said output circuitry comprises a multiplexer having a first input port coupled to said second code output and further having an output coupled to said second input of said comparator in said base unit, said multiplexer further having a select input port coupled to said card reset signal line and said multiplexer further having a second input port,
- and wherein said peripheral unit further comprises a source of download data coupled to said second input port of said multiplexer.

28. Apparatus according to claim 27, wherein said source of download data comprises a ROM in said peripheral unit.

29. Apparatus according to claim 28, wherein said control signal lines further include a card enable line connected to said peripheral card functional unit,
- wherein said ROM has an address input port;
- and wherein said peripheral unit further comprises an address counter having a clock input coupled to said card enable line and further having a count output coupled to said ROM address input port.

30. Apparatus according to claim 27, wherein said card reset line is further coupled to said second code production unit, said second code production unit resetting to a predetermined state in response to sampling a signal asserted on said card reset line.

\* \* \* \* \*